(12) United States Patent
Sasaki et al.

(10) Patent No.: US 11,579,500 B2
(45) Date of Patent: Feb. 14, 2023

(54) LIQUID CRYSTAL DISPLAY DEVICE

(71) Applicant: Shanghai Tianma Micro-Electronics Co., Ltd., Shanghai (CN)

(72) Inventors: Takeshi Sasaki, Kanagawa (JP); Tsutomu Kadotani, Kanagawa (JP); Hidenori Ikeno, Kanagawa (JP)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/131,955

(22) Filed: Dec. 23, 2020

(65) Prior Publication Data

US 2021/0200044 A1 Jul. 1, 2021

(30) Foreign Application Priority Data

Dec. 26, 2019 (JP) .............................. JP2019-236881

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136286* (2013.01)

(58) Field of Classification Search
CPC .................. G02F 1/1347; G02F 1/1368; G02F 1/136209; G02F 1/136286
See application file for complete search history.

(56) References Cited

U.S. PATENT DOCUMENTS

| | | | | |
|---|---|---|---|---|
| 6,259,493 B1* | 7/2001 | Nakamura | ........ | G02F 1/136286 349/38 |
| 10,191,337 B2* | 1/2019 | Ono | ..................... | G09G 3/3611 |
| 10,379,412 B2* | 8/2019 | Ono | .................. | G02F 1/133602 |
| 2014/0347582 A1* | 11/2014 | Murao | .................. | G02B 30/31 349/15 |

FOREIGN PATENT DOCUMENTS

| | | |
|---|---|---|
| JP | H05-119341 | 5/1993 |
| JP | 2007-139865 | 6/2007 |
| JP | 2007-155780 | 6/2007 |
| JP | 2019-061124 | 4/2019 |
| JP | 2010-015117 | 1/2020 |

* cited by examiner

*Primary Examiner* — Dung T Nguyen
(74) *Attorney, Agent, or Firm* — Nixon & Vanderhye

(57) ABSTRACT

A display device includes a first liquid crystal panel configured to display an image to be seen by the observer, and a second liquid crystal panel laid on the first liquid crystal panel. The second liquid crystal panel includes a black matrix defining pixels, opaque gate lines disposed to be distant from one another in a first direction, and opaque data lines disposed to be distant from one another in a second direction different from the first direction. Lines of the black matrix disposed to be distant from one another in the first direction and the gate lines constitute dark lines disposed at a specified pitch in the first direction. Lines of the black matrix disposed to be distant from one another in the second direction and the data lines constitute dark lines disposed at a specified pitch in the second direction.

8 Claims, 13 Drawing Sheets

LIQUID CRYSTAL DISPLAY DEVICE

CROSS-REFERENCE TO RELATED APPLICATIONS

This non-provisional application claims priority under 35 U.S.C. § 119(a) on Patent Application No. 2019-236881 filed in Japan on Dec. 26, 2019, the entire content of which is hereby incorporated by reference.

BACKGROUND

This disclosure relates to a liquid crystal display device.

Liquid crystal display devices are applied widely from small-size mobile phones to large-size television monitors because of their characteristics to achieve low power consumption and high resolution. However, the contrast value of a liquid crystal display device placed alone in a dark environment is about 1000 to 2000 at most, which is low compared to the value of an organic light emitting diode (OLED) display device, several millions. This brings a problem that a liquid crystal display device cannot provide sufficient reality in displaying images produced by an imaging source having rich expressions of black, like high dynamic range (HDR) images in recent years.

Meanwhile, another problem of a liquid crystal display device is pointed out: when an on-vehicle display device or on-vessel instrument is used in night time, light from the backlight leaks out to a region displaying black to cause a phenomenon so-called black floating, making it difficult to accurately discriminate the displayed information. To assure highly discriminable display, improvement of black display (drastic improvement in contrast ratio) is demanded.

To solve these problems, the contrast ratio of the liquid crystal display device has to be improved drastically. However, the contrast ratio of a conventional liquid crystal display device is about 2000:1 at most, as described above; the contrast ratio required for the foregoing applications, dozens of thousands to one, cannot be attained.

To address this problem of a liquid crystal display device, stacking a plurality of liquid crystal panels is proposed to raise the contrast ratio by lowering the black level. A contrast higher than the contrast available from a single liquid crystal panel can be attained by stacking a plurality of liquid crystal panels.

Usually, one of the stacked liquid crystal panels is a color liquid crystal panel for displaying images to be seen by the observer and it is disposed closer to the observer. The other liquid crystal panel is disposed between the backlight and the color liquid crystal panel and displays monochrome images.

SUMMARY

An aspect of this disclosure is a display device including: a first liquid crystal panel configured to display an image to be seen by the observer; and a second liquid crystal panel laid on the first liquid crystal panel, the second liquid crystal panel including pixels a natural number times as large as pixels of the first liquid crystal panel. The second liquid crystal panel includes: a black matrix defining pixels; a plurality of opaque gate lines disposed to be distant from one another in a first direction; and a plurality of opaque data lines disposed to be distant from one another in a second direction different from the first direction. At least either the plurality of gate lines or the plurality of data lines pass through the pixels. Lines of the black matrix disposed to be distant from one another in the first direction and the gate lines constitute dark lines disposed at a specified pitch in the first direction. Lines of the black matrix disposed to be distant from one another in the second direction and the data lines constitute dark lines disposed at a specified pitch in the second direction.

It is to be understood that both the foregoing general description and the following detailed description are exemplary and explanatory and are not restrictive of this disclosure.

EMBODIMENTS

Figure 1:
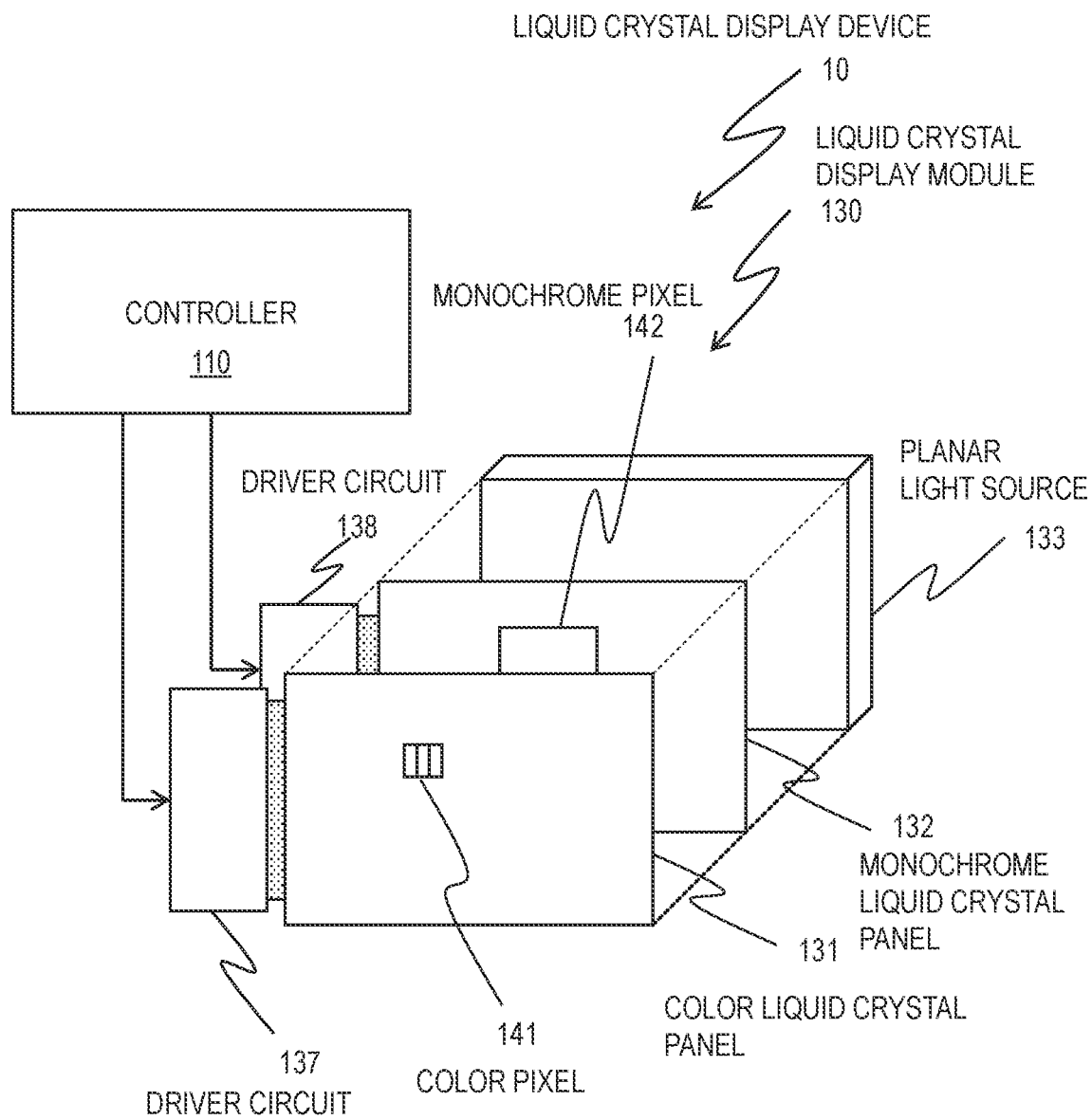
FIG. 1 schematically illustrates a liquid crystal display device in the embodiments of this disclosure.

Hereinafter, embodiments of this disclosure will be described with reference to the accompanying drawings. It should be noted that the embodiments are merely examples to implement the idea of this disclosure and not to limit the technical scope of this disclosure. Elements common to the drawings are denoted by the same reference signs. For clear understanding of the description, the elements in the drawings may be exaggerated in size or shape.

Hereinafter, a liquid crystal display device including a plurality of stacked liquid crystal panels. The first liquid crystal panel displays an image to be seen by the observer and the second liquid crystal panel has pixels larger than those of the first liquid crystal panel. Since the second liquid crystal panel has large pixels, the dark parts generated by the black matrix has low spatial frequency to be more perceivable. The second liquid crystal panel can be configured in such a manner at least either the data lines or the gate lines pass through pixel regions to increase the spatial frequency of dark parts. As a result, the dark parts become less perceivable.

Embodiment 1

FIG. 1 schematically illustrates a liquid crystal display device in the embodiments of this disclosure. The liquid crystal display device 10 includes a controller 110 and a liquid crystal display module 130. The liquid crystal display module 130 includes a plurality of stacked (layered) liquid crystal panels. The configuration example in FIG. 1 includes two liquid crystal panels 131 and 132.

The controller 110 converts an image signal received from the external to generate signals for the liquid crystal display module 130 to display an image. The controller 110 sends the generated signals to driver circuits 137 and 138 for the liquid crystal panels 131 and 132 of the liquid crystal display module 130.

The liquid crystal display module 130 includes driver circuits 137 and 138, liquid crystal panels 131 and 132, and a planar light source 133. The liquid crystal panel 131 is a color liquid crystal panel for color display. The liquid crystal panel 132 is a monochrome liquid crystal panel for monochrome display. The monochrome liquid crystal panel 132 and the planar light source 133 constitute a light source device.

In the configuration example in FIG. 1, the monochrome liquid crystal panel (second liquid crystal panel) 132 is provided between the color liquid crystal panel (first liquid crystal panel) 131 and the planar light source 133. That is to say, the color liquid crystal panel 131 is disposed closer to the observer and the monochrome liquid crystal panel 132 is disposed closer to the planar light source 133.

The driver circuits 137 and 138 drive the color liquid crystal panel 131 and the monochrome liquid crystal panel 132, respectively, in accordance with the signals received from the controller 110. The planar light source 133 illuminates the monochrome liquid crystal panel 132 from behind the monochrome liquid crystal panel 132. The monochrome liquid crystal panel 132 controls the amounts of light to be transmitted based on the input driving signal. The light transmitted through the monochrome liquid crystal panel 132 enters the color liquid crystal panel 131. The color liquid crystal panel 131 displays an image based on the input driving signal. The observer views the displayed image produced by the light emitted from the planar light source 133 and transmitted through the liquid crystal panels 132 and 131.

A pixel 141 of the color liquid crystal panel 131 consists of three adjacent subpixels for three colors of red (R), green (G), and blue (B). A pixel 142 of the monochrome liquid crystal panel 132 is not divided into subpixels (one pixel consists of one subpixel). The resolution (the number of pixels) of the color liquid crystal panel 131 is higher than the resolution (the number of pixels) of the monochrome liquid crystal panel 132. The liquid crystal panels 131 and 132 are disposed so that, for example, nine or sixteen pixels of the color liquid crystal panel 131 are superposed on a pixel of the monochrome liquid crystal panel 132 when viewed planarly.

In one implementation example, the boundary of a pixel of the monochrome liquid crystal panel 132 coincides with the boundaries of pixels of the color liquid crystal panel 131 when viewed planarly. In another example, the boundary of a pixel of the monochrome liquid crystal panel 132 do not have to coincide with the boundaries of pixels of the color liquid crystal panel 131 when viewed planarly. The number of pixels of the color liquid crystal panel 131 superposed on one pixel of the monochrome liquid crystal panel 132 when viewed planarly can be different among the pixels of the monochrome liquid crystal panel 132.

The above-described configuration example has a color filter layer on only one of the plurality of liquid crystal panels. As a result, significant difference in brightness of the display depending on the angle to see, which is caused by the positional differences among a plurality of color filter layers, is prevented. The liquid crystal display device in this embodiment can include three or more liquid crystal panels and also, two or more color liquid crystal panels.

Figure 2:
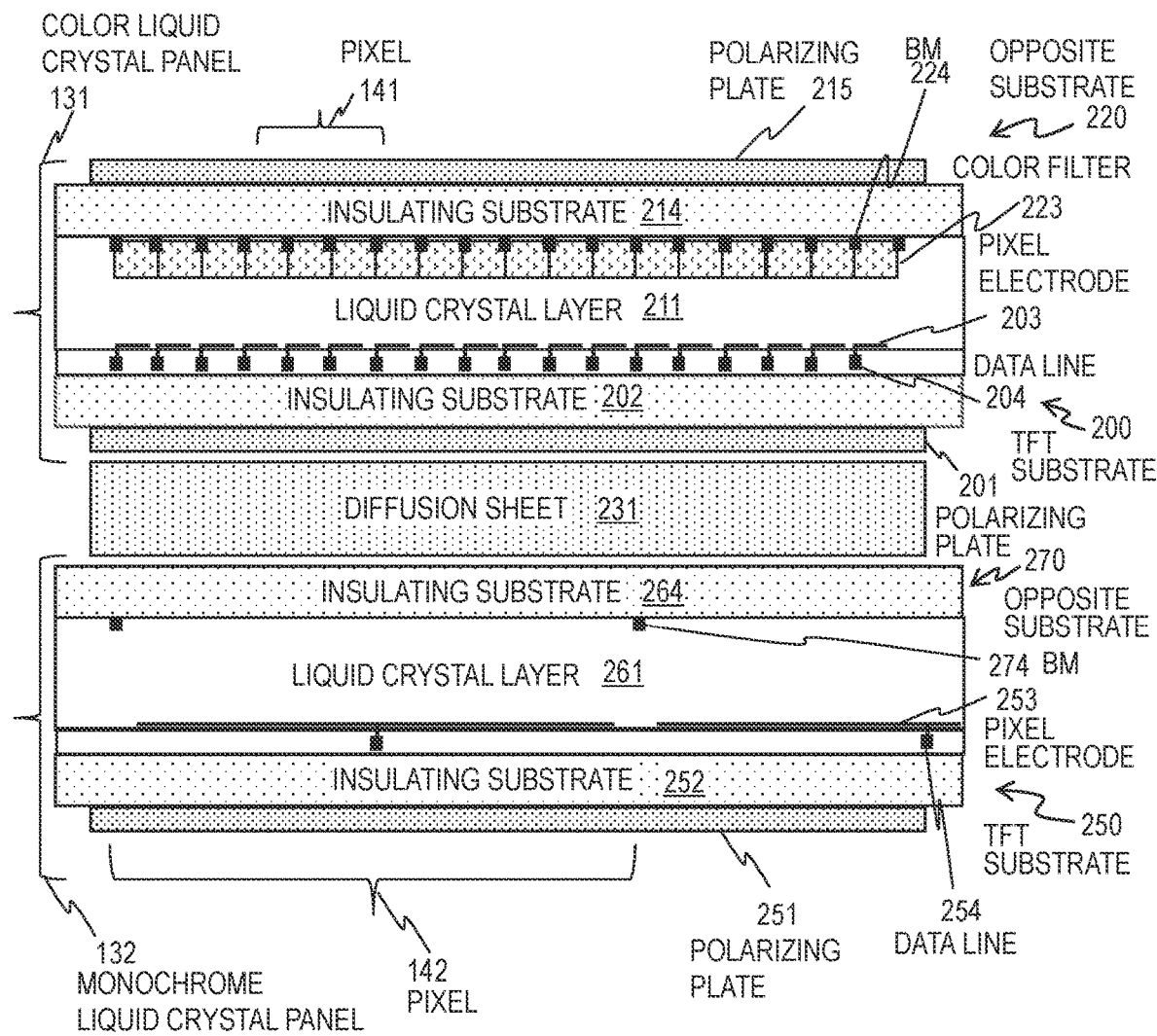
FIG. 2 illustrates an example of the cross-sectional structure of the display region of a liquid crystal display module.

FIG. 2 illustrates an example of the cross-sectional structure of the display region of the liquid crystal display module 130. A color liquid crystal panel 131 and a monochrome liquid crystal panel 132 are stacked and a diffusion sheet 231 is interposed between the monochrome liquid crystal panel 132 and the color liquid crystal panel 131. The diffusion sheet 231 prevents generation of moire patterns caused by the pixel pitch of the color liquid crystal panel and the pixel pitch of the monochrome liquid crystal panel.

The color liquid crystal panel 131 is a transmissive type of liquid crystal panel and includes a TFT substrate 200 and an opposite substrate 220 opposed to the TFT substrate 200. A liquid crystal layer 211 is sandwiched between the TFT substrate 200 and the opposite substrate 220. The TFT substrate 200 includes an insulating substrate 202. The insulating substrate 202 is an insulative transparent substrate made of glass or resin. An example of the insulating substrate 202 has a rectangular shape and one of the main faces is opposed to one of the main faces of the opposite substrate 220. A polarizing plate 201 is attached on the other main face of the insulating substrate 202 on the opposite side of the liquid crystal layer 211.

Pixel electrodes 203 for applying electric fields to the liquid crystal layer 211 are arrayed on the main face of the insulating substrate 202 facing the liquid crystal layer 211. Common electrodes for applying electric fields with the pixel electrodes 203 to the liquid crystal layer 211 are omitted in FIG. 2. One pixel electrode 203 controls the amount of light to be transmitted through one subpixel. Data lines 204 transmit data signals (voltages) to be supplied to the pixel electrodes 203.

A not-shown thin film transistor (TFT) array for selecting a subpixel to be controlled is fabricated on the insulating substrate 202. Further, a not-shown alignment film is laid to cover the electrode layer including the pixel electrodes 203. The alignment film is in contact with the liquid crystal layer 211 to define the orientation (initial alignment) of liquid crystal molecules when no electric field is applied.

The color liquid crystal panel 131 can be any type of liquid crystal panel; it can be a vertical electric field control type or a horizontal electric field control type of liquid crystal panel. Examples of the vertical electric field control type of liquid crystal panels include twisted nematic (TN) type or vertical alignment (VA) type of liquid crystal panels. Examples of the horizontal electric field control type of liquid crystal panels include in-plane switching (IPS) type and fringe field switching (FFS) type of liquid crystal panels.

The opposite substrate 220 is a color filter (CF) substrate including color filters. The opposite substrate 220 includes an insulating substrate 214 made of glass or resin. The insulating substrate 214 can have a rectangular shape. A polarizing plate 215 is attached on the main face of the insulating substrate 214 on the opposite side of the liquid crystal layer 211.

A grid-like black matrix 224 for defining pixels and subpixels is laid on the main face of the insulating substrate 214 on the side of the liquid crystal layer 211. Each region corresponding to a subpixel surrounded by the black matrix 224 is provided with a color filter 223 for red, green, or blue. A not-shown alignment film is laid on the color filters 223. The alignment film is in contact with the liquid crystal layer 211 and defines the orientation (initial alignment) of the liquid crystal molecules when no electric field is applied.

Either the TFT substrate 200 or the opposite substrate 220 is located on the front to face the observer and the other substrate is located on the back. Accordingly, the planar light source 133 is disposed under the TFT substrate 200 or above the opposite substrate 220 of the liquid crystal panel 131.

The liquid crystal layer 211 controls the amount of light to be transmitted through each subpixel in accordance with the electric field between a pixel electrode 203 and a common electrode (not shown). The driver circuit 137 selects each subpixel with the associated TFT and controls the potential of the pixel electrode 203 for the subpixel. The driver circuit 137 controls the potential of the pixel electrode 203 of each subpixel in accordance with image data to control the amount of light to be transmitted through the subpixel.

The monochrome liquid crystal panel 132 has a configuration such that the color filters 223 and the polarizing plate 201 are removed from the configuration example of the color liquid crystal panel 131 illustrated in FIG. 2. The polarizing plate 201 functions as the polarizing plate for the monochrome liquid crystal panel 132, too.

The monochrome liquid crystal panel 132 is a transmissive type of liquid crystal panel and includes a TFT substrate 250 and an opposite substrate 270 opposed to the TFT substrate 250. A liquid crystal layer 261 is sandwiched between the TFT substrate 250 and the opposite substrate 270. The TFT substrate 250 includes an insulating substrate 252. The insulating substrate 252 is an insulative transparent substrate made of glass or resin. An example of the insulating substrate 252 has a rectangular shape and one of the main faces is opposed to one of the main faces of the opposite substrate 270. A polarizing plate 251 is attached on the other main face of the insulating substrate 252 on the opposite side of the liquid crystal layer 261.

Pixel electrodes 253 for applying electric fields to the liquid crystal layer 261 are arrayed on the main face of the insulating substrate 252 facing the liquid crystal layer 261. Common electrodes for applying electric fields with the pixel electrodes 253 to the liquid crystal are omitted in FIG. 2. The pixel electrodes 253 and the common electrodes can be made of a transparent conductor such as ITO or IZO. One pixel electrode 253 controls the amount of light to be transmitted through one pixel. Data lines 254 transmit data signals (voltages) to be supplied to the pixel electrodes 253.

A not-shown thin film transistor (TFT) array for selecting a pixel to be controlled is fabricated on the insulating substrate 252. Further, a not-shown alignment film is laid to cover the electrode layer including the pixel electrodes 253. The alignment film is in contact with the liquid crystal layer 261 to define the orientation (initial alignment) of liquid crystal molecules when no electric field is applied.

The monochrome liquid crystal panel 132 can be any type of liquid crystal panel; it can be a vertical electric field control type or a horizontal electric field control type of liquid crystal panel. Examples of the vertical electric field control type of liquid crystal panels include twisted nematic (TN) type or vertical alignment (VA) type of liquid crystal panels. Examples of the horizontal electric field control type of liquid crystal panels include in-plane switching (IPS) type and fringe field switching (FFS) type of liquid crystal panels.

The opposite substrate 270 includes a black matrix 274 for defining pixels (pixel regions). The opposite substrate 270 includes an insulating substrate 264 made of glass or resin. The insulating substrate 264 can have a rectangular shape. A grid-like black matrix 274 for defining pixels is laid on the main face of the insulating substrate 264 on the side of the liquid crystal layer 261. A not-shown alignment film is laid on the black matrix 274. The alignment film is in contact with the liquid crystal layer 261 and defines the orientation (initial alignment) of the liquid crystal molecules when no electric field is applied.

The liquid crystal layer 261 controls the amount of light to be transmitted through each pixel in accordance with the electric field between a pixel electrode 253 and a common electrode (not shown). The driver circuit 138 selects each pixel with the associated TFT and controls the potential of the pixel electrode 253 for the pixel. The driver circuit 138 controls the potential of the pixel electrode 253 in accordance with image data to control the amount of light to be transmitted through the pixel.

As described above, the color liquid crystal panel 131 has a role to display fine images to be seen by the observer and the monochrome liquid crystal panel 132 has a role to control the brightness information of the images in units of region larger than a pixel of the images. The pixel size of the monochrome liquid crystal panel 132 is larger than the pixel size of the color liquid crystal panel 131. For example, the pixel size of the monochrome liquid crystal panel 132 is natural number times as large as the pixel size of the color liquid crystal panel 131.

Figure 3:
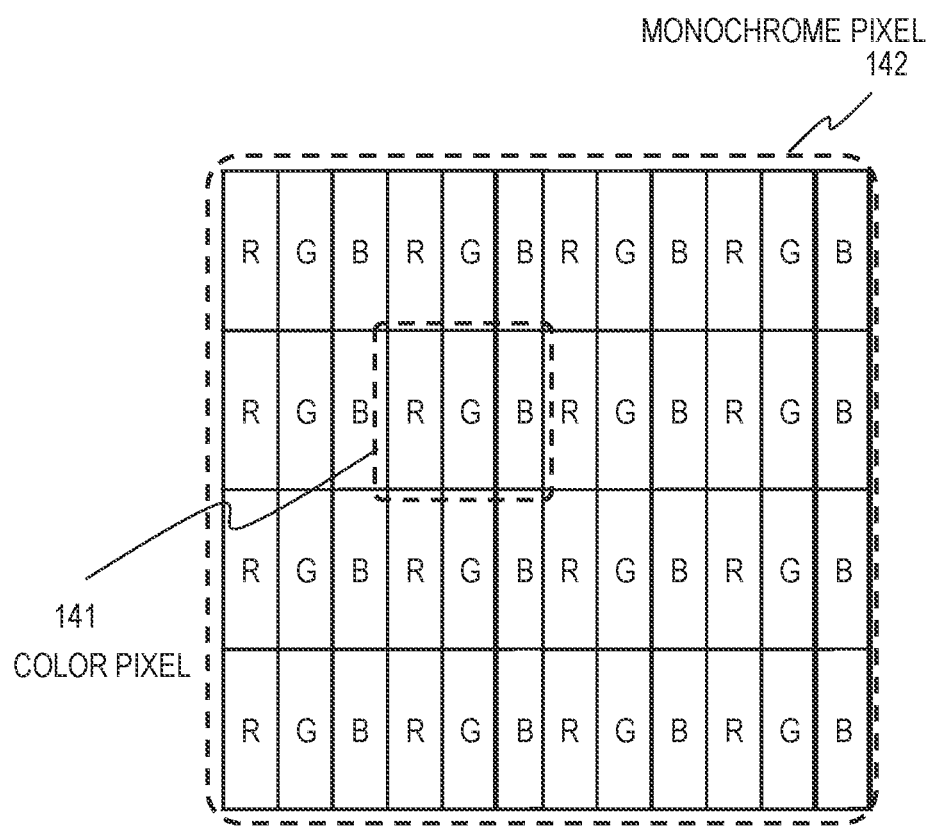
FIG. 3 schematically illustrates dimensional and positional relations between color pixels of a color liquid crystal panel and a monochrome pixel of a monochrome liquid crystal panel.

FIG. 3 schematically illustrates dimensional and positional relations between pixels (color pixels) 141 of the color liquid crystal panel 131 and a pixel (monochrome pixel) 142 of the monochrome liquid crystal panel 132. In the example in FIG. 3, one monochrome pixel 142 has a size corresponding to sixteen color pixels 141; these color pixels 141 are superposed on the monochrome pixel 142 when viewed planarly. In the example in FIG. 3, the four sides of each color pixel 141 are equal and the four sides of the monochrome pixel 142 are equal. The number of color pixels to be superposed on a monochrome pixel is not limited specifically. The four sides of a monochrome pixel do not need to be equal and the four sides of a color pixel do not need to be equal. The shapes of the monochrome pixel and the color pixel are not limited to specific ones.

As understood from the above, the monochrome liquid crystal panel 132 controls transmittance of a region larger than a pixel of the image to be displayed actually and accordingly, the monochrome liquid crystal panel 132 can have large pixels and high aperture ratio. However, having large pixels means that the pitch of dark parts provided by the black matrix 274 for defining the pixels is large, or that the spatial frequency of the dark parts is low; the dark parts are more perceivable for the observer.

The monochrome liquid crystal panel 132 in this embodiment includes opaque gate lines and/or data lines disposed off the black matrix 274 and passing through pixels 142 when viewed planarly. This configuration attains high spatial frequency (small pitch) of the dark parts provided by the black matrix 274 and the gate lines and/or the data lines, so that the dark parts become less perceivable for the observer.

Figure 4:
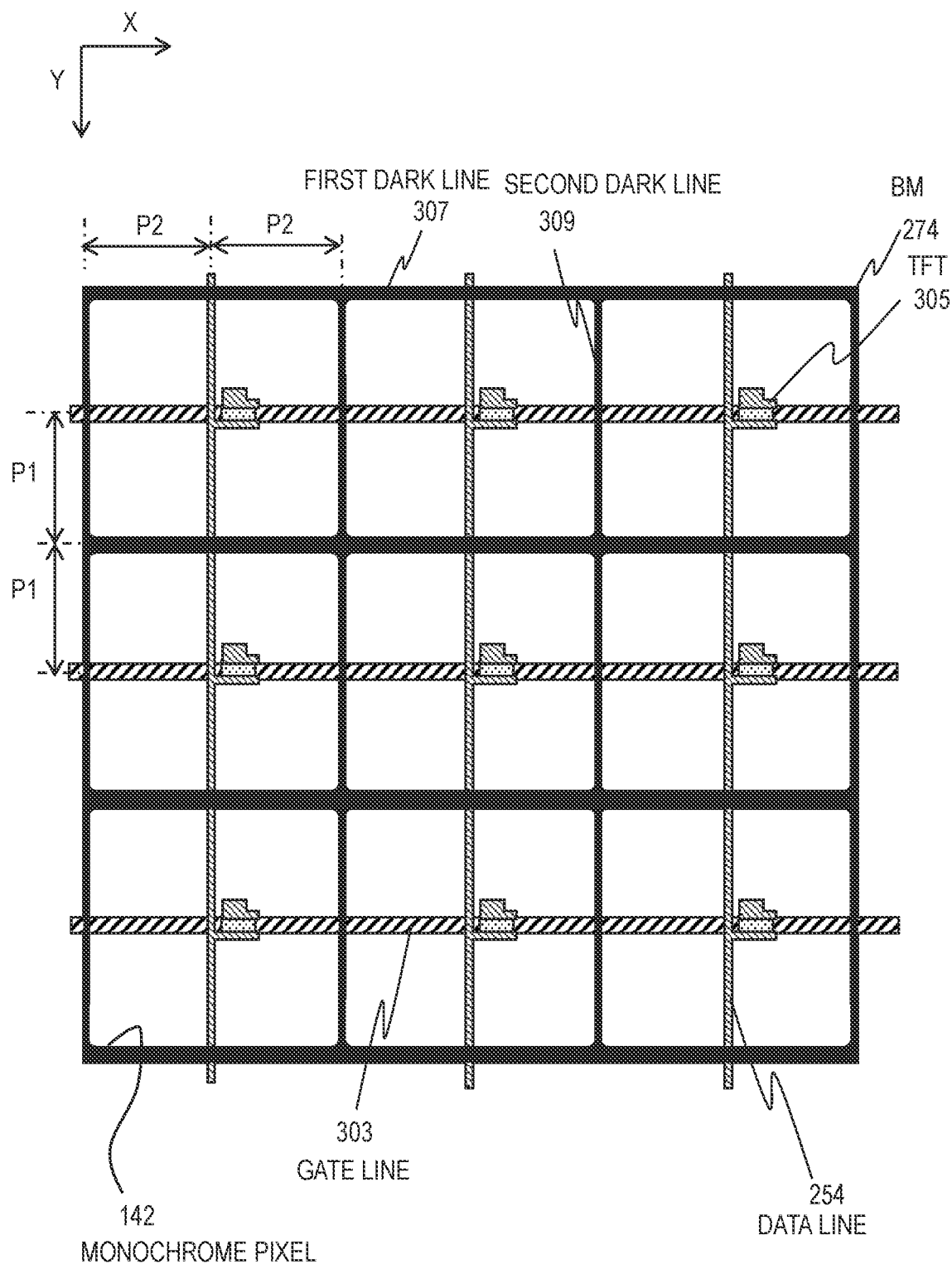
FIG. 4 is a plane diagram of a configuration example of a monochrome liquid crystal panel.

FIG. 4 is a plane diagram of a configuration example of the monochrome liquid crystal panel 132 in this embodiment. FIG. 4 illustrates a layout of a black matrix, data lines, gate lines, and TFTs. The black matrix 274 in FIG. 4 has a grid-like shape and defines pixels. The black matrix 274 is composed of a plurality of first dark lines 307 disposed to extend in the horizontal direction (in the X-axis direction/the second direction) and be distant from one another in the vertical direction (in the Y-axis direction/the first direction) and a plurality of second dark lines 309 disposed to extend in the vertical direction and be distant from one another in the horizontal direction. The angle between the vertical direction and the horizontal direction is the right angle.

In this example, the first dark lines 307 are disposed to be equally distant from one another in the vertical direction and their line widths are equal; the second dark lines 309 are disposed to be equally distant from one another in the horizontal direction and their line widths are equal. The region surrounded by two adjacent first dark lines 307 and two adjacent second dark lines 309 is a monochrome pixel (region) 142.

The gate lines 303 are opaque to the light from the backlight and disposed to extend in the horizontal direction and to be distant from one another in the vertical direction in FIG. 4. The gate lines 303 in the example in FIG. 4 are disposed to be equally distant from one another in the vertical direction and their shapes are identical. The gate lines 303 are disposed at places different from the first dark lines 307 of the black matrix 274 without overlap, when viewed planarly.

Accordingly, each gate line 303 passes through pixels 142. Each gate line 303 in the example FIG. 4 passes through the middle of the pixels 142; the gate lines 303 and the first dark lines 307 constitute a dark line set disposed at equal intervals (a specified pitch) P1 in the vertical direction. In an example, the width of the gate lines 303 is equal to the width of the first dark lines 307.

The data lines 254 are opaque to the light from the backlight. They are disposed to extend in the vertical direction and be distant from one another in the horizontal direction in FIG. 4. The data lines 254 in the example in FIG. 4 are disposed to be equally distant from one another in the horizontal direction and their shapes are identical. The data lines 254 are disposed at different positions from the second dark lines 309 of the black matrix 274 without overlap, when viewed planarly.

Accordingly, each data line 254 passes through pixels 142. Each data line 254 in the example FIG. 4 passes through the middle of the pixels 142; the data lines 254 and the second dark lines 309 constitute a dark line set disposed at equal intervals (a specified pitch) P2 in the horizontal direction. In an example, the width of the data lines 254 is equal to the width of the second dark lines 309.

At each intersection between a gate line 303 and a data line 254, a TFT (switching element) 305 is provided. Since the gate line 303 and the data line 254 pass through the middle of a pixel 142, the TFT 305 is provided at the center of the pixel 142. No other dark line passes through the pixel.

In the configuration example in FIG. 4, common electrodes and common lines for supplying a voltage to the common electrodes are made of transparent conductive material and have light transmissivity. Accordingly, dark parts are not generated by the common lines for the common electrodes. The common lines can be opaque and disposed to be hidden by the data lines or gate lines when viewed planarly. In the case of a vertical electric field control type of liquid crystal panel or an FFS type of liquid crystal panel, a light transmissive common electrode covering the entire display region can be provided. As described above, this example does not include any dark line that passes through a pixel defined by the black matrix, except for the gate lines and data lines. The same applies to the examples to be described later.

In FIG. 4, the second dark lines 309 and the data lines 254 are disposed to extend straight. However, their disposition is designed appropriately for the layout of the subpixels of the color liquid crystal panel to be laid on the monochrome liquid crystal panel. For example, there is a technique so-called multi-domain alignment to enlarge the viewing angle. This technique divides a pixel into a plurality of domains and aligns the liquid crystal in each domain in a different orientation.

In applying such a technique to an IPS type or an FFS type of liquid crystal panel, pixel electrodes are bent within subpixels and therefore, the black matrix and the data lines could be bent together. To lay a monochrome liquid crystal panel on such a color liquid crystal panel, it is preferable that the second dark lines 309 and the data lines 254 be designed to accord with the bends of the black matrix and the data lines of the color liquid crystal panel. The same applies to the embodiments to be described later.

Figure 5:
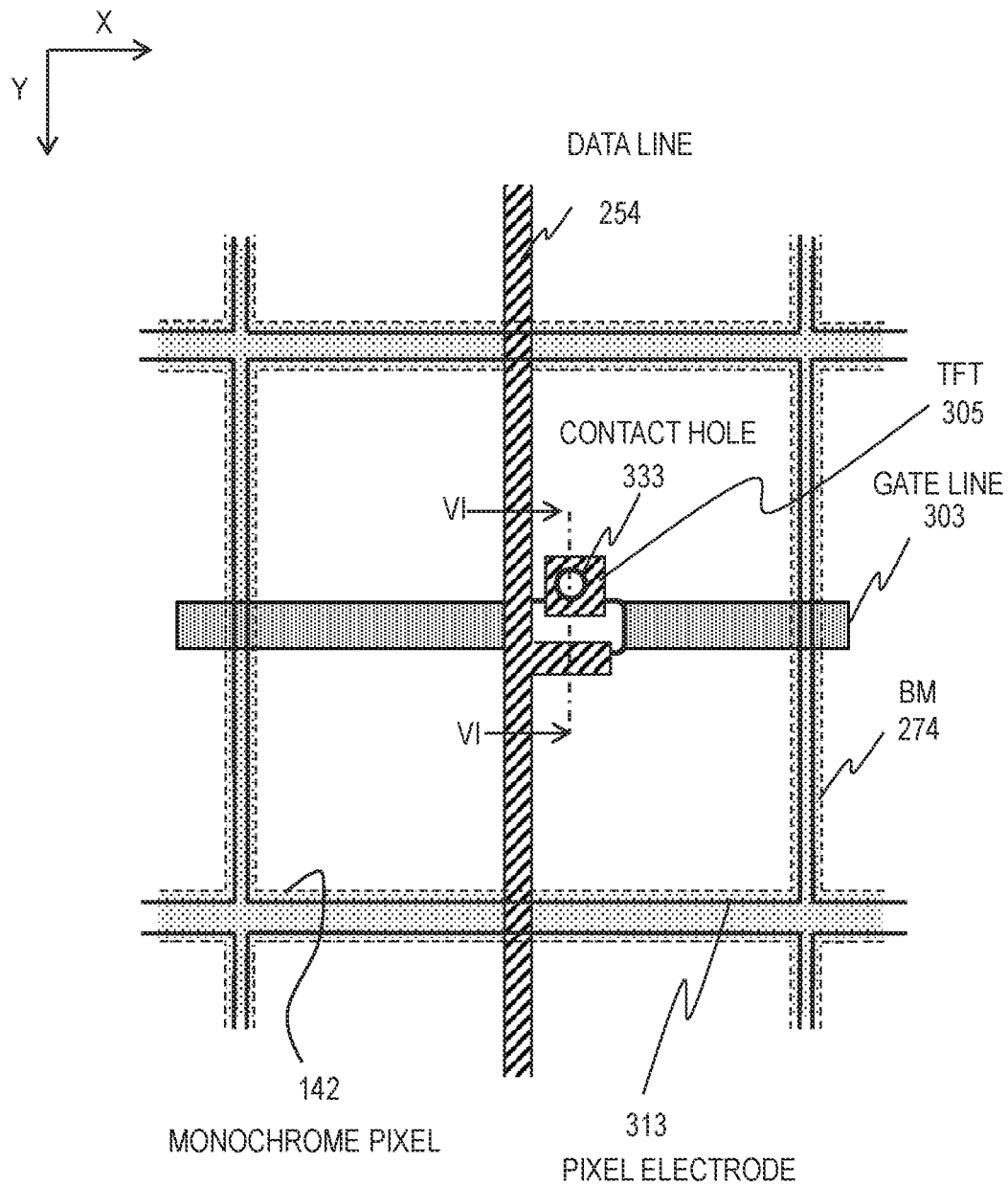
FIG. 5 is an enlarged diagram of a monochrome pixel in FIG. 4.

FIG. 5 is an enlarged diagram of a monochrome pixel 142 in FIG. 4. The TFT 305 connected with a gate line 303 and a data line 254 is connected with the pixel electrode 313 in a contact hole 333. The black matrix 274 defining the monochrome pixel 142 is surrounded by broken lines.

In the case of displaying images with one liquid crystal panel, the TFTs are usually covered with the black matrix and shielded from the external light to prevent the external light from affecting the characteristics of the TFTs. In this example, however, a color liquid crystal panel is laid over the monochrome liquid crystal panel and the black matrix of the color liquid crystal panel shields the monochrome liquid crystal panel from light. Accordingly, the black matrix for shading the TFTs 305 is not exactly necessary. Accordingly, a black matrix for shading the TFT 305 is not provided in FIG. 5.

In the example of FIG. 5, the pixel electrode 313 is a transparent electrode covering the entire monochrome pixel (region) 142. When the TFT 305 is turned on by the gate line 303, the TFT 305 supplies the data signal (voltage) from the data line 254 to the pixel electrode 313. The pixel electrode can have any shape suitable for the type of the monochrome liquid crystal panel 132 as far as it can control the amount of light to be transmitted through the pixel. Usually, the pixel electrode is made of a transparent conductor (such as ITO).

Figure 6:
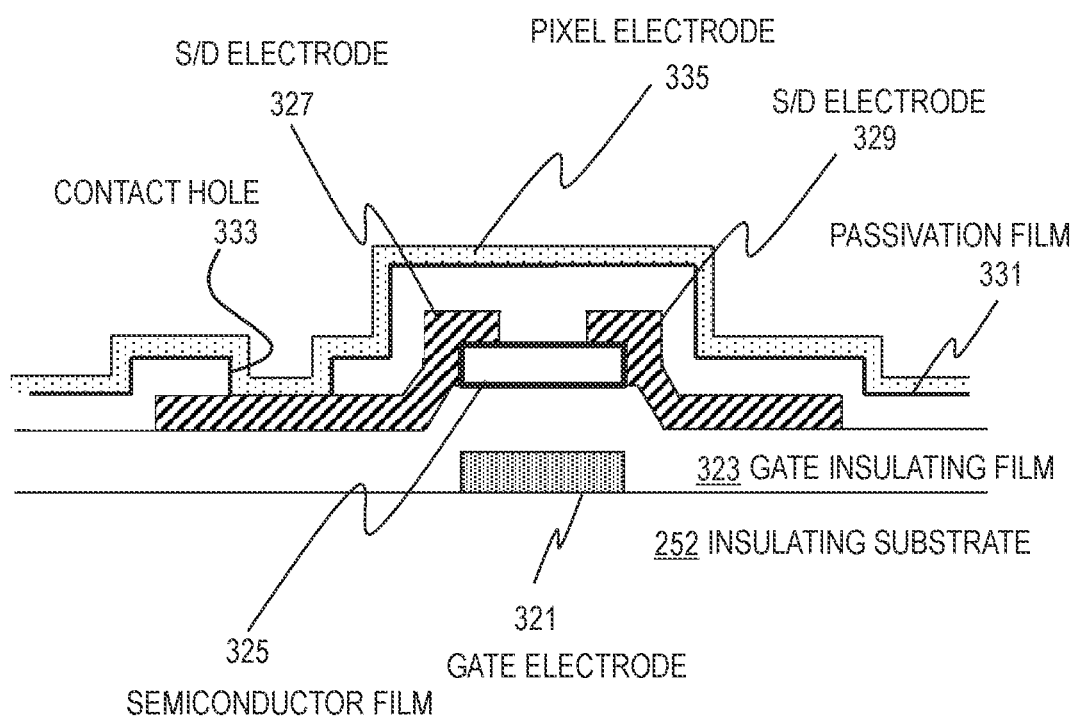
FIG. 6 is a cross-sectional diagram along the section line VI-VI in FIG. 5.

FIG. 6 is a cross-sectional diagram along the section line VI-VI in FIG. 5. A gate electrode 321 is provided on the main face of the insulating substrate 252 facing the liquid crystal layer (not shown in FIG. 6). The gate electrode 321 can be a part of a gate line 303. The gate electrode 321 has a single-layer or multi-layer structure of a metal such as Al, Mo, or Cr or an alloy thereof. The gate line 303 can be made of the same material as the gate electrode 321.

A gate insulating film 323 is provided to cover the gate electrode 321. The gate insulating film 323 can be a silicon nitride film, a silicon oxide film, or a laminate of these films. A semiconductor film 325 included in the TFT 305 is provided on the gate insulating film 323 to overlap the gate electrode 321 when viewed planarly.

Further, source/drain electrodes 327 and 329 are provided on the gate insulating film 323 to be in contact with the semiconductor film 325. The source/drain electrodes 327 and 329 have a single-layer or multi-layer structure of a metal such as Al, Mo, or Cr or an alloy thereof. The data line 254 can be made of the same material as the source/drain electrodes 327 and 329.

A passivation film 331 is provided to cover the source/drain electrodes 327 and 329 and the semiconductor film 325. The passivation film 331 can be a silicon nitride film, a silicon oxide film, or a laminate of these films. A contact hole 333 is opened through the passivation film 331 to expose the source/drain electrode 327. The pixel electrode 335 is in contact with the source/drain electrode 327 in the contact hole 333.

Figure 7:
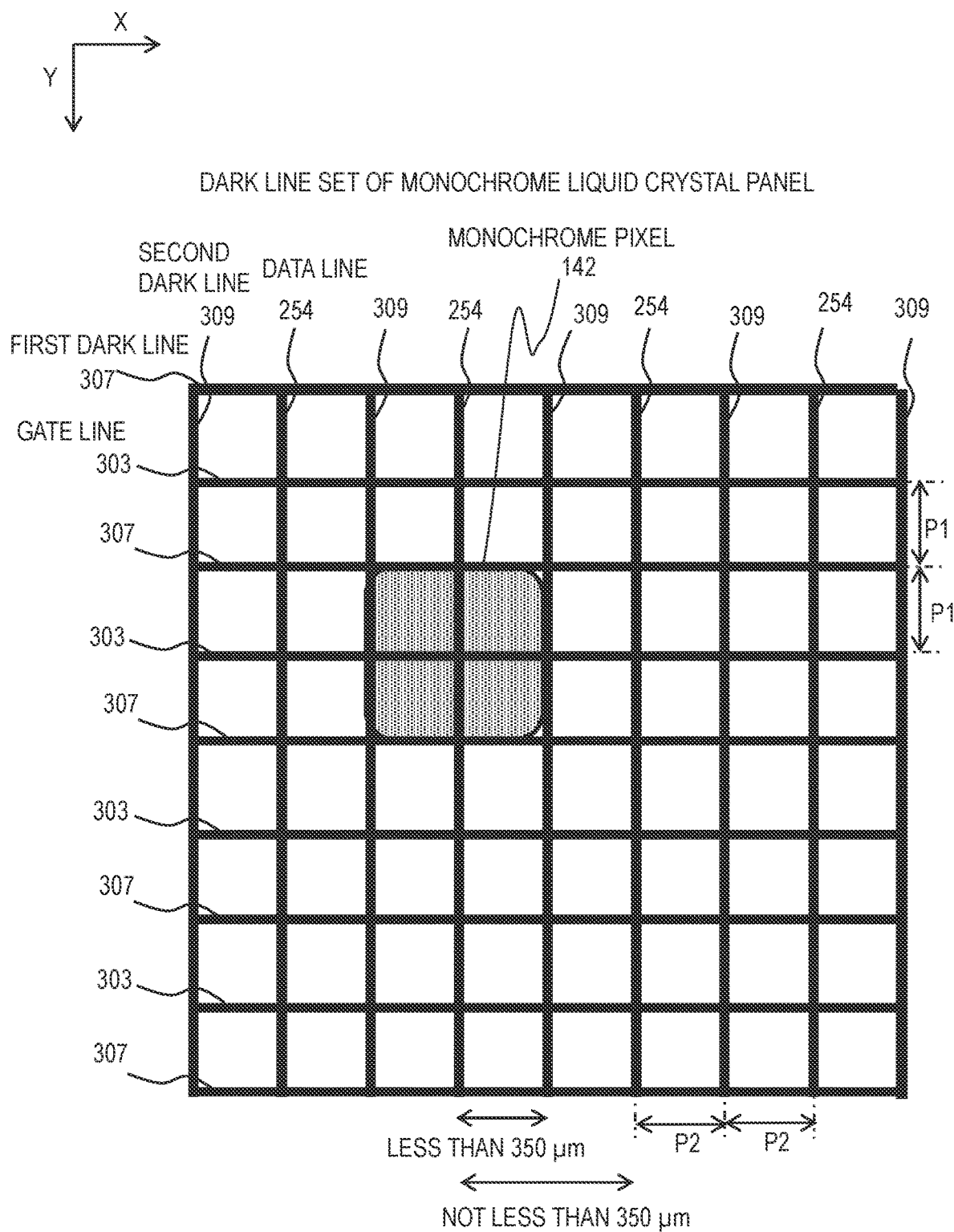
FIG. 7 schematically illustrates a dark line set of a monochrome liquid crystal panel.

FIG. 7 schematically illustrates a dark line set of the monochrome liquid crystal panel 132. The dark line set is composed of the black matrix 274, the gate lines 303, and the data lines 254 disposed like a grid. In the example of FIG. 7, the gate lines 303 and the first dark lines 307 constitute a dark line set disposed at equal intervals (a specified pitch) P1 in the vertical direction (the Y-axis direction). This dark line set has high spatial frequency in the vertical direction and therefore, the dark line set composed of the gate lines 303 and the first dark lines 307 is less perceivable.

The data lines 254 and the second dark lines 309 constitute a dark line set disposed at equal intervals (a specified pitch) P2 in the horizontal direction (the X-axis direction). This dark line set has high spatial frequency in the horizontal direction and therefore, the dark line set composed of the data lines 254 and the second dark lines 309 is less perceivable.

In the configuration example illustrated in FIGS. 4 and 7, the black matrix 274 does not need to cover the gate lines 303 or the data lines 254. For this reason, the first dark lines 307 and the second dark lines 309 can be made thin, for example, as thin as the gate lines and the data lines. This configuration makes the dark line set still less perceivable.

It is known that the human visual system has a spatial frequency characteristic. Taking an example of a grating pattern in which the brightness varies in accordance with a sine-wave function, the stripes of the grating become wider as the frequency of the sine-wave function is lowered; the human eye can discriminate between the brightness and the darkness of the stripes. Conversely, the stripes become narrower as the frequency of the sine-wave function is raised; the human eye cannot discriminate between the brightness and the darkness of the stripes. Another good example to explain a visual characteristic is the Landolt ring used in visual acuity tests.

When the Landolt ring is small and the gap in the ring is narrow, the human eye cannot perceive the gap. When the Landolt ring is large and the gap is wide, the human eye perceives the gap. Further, the gap can or cannot be perceived depending on the distance to see the Landolt ring. As understood from the foregoing examples, the human eye has a spatial characteristic and a resolution and accordingly, if a cyclic or regular pattern of brightness and darkness is on the screen of a display device, the human eye may perceive it to make the observer feel that the image quality is poor.

Accordingly, the pitch of the dark lines in the monochrome liquid crystal panel 132 are determined to have a spatial frequency higher than the resolution of the human eye in consideration of the distance to the observer to see the image displayed on the color liquid crystal panel 131.

The resolution of the human eye can be represented by the smallest visual angle at which an object is perceivable. The visual angle is an angle a viewed object subtends at the eye. In general, it is said that the resolution of a human eye having a visual acuity of 1.0 is the visual angle of 1/60° (=1 arc-minute). Replacing this resolution with a cycle of brightness and darkness, a spatial frequency of 1/30° (=2 arc-minutes) is obtained.

Accordingly, the perceivable minimum pitch P can be expressed by the following formula:

$$P = L * \sin(\pi/(180*30)),$$

where L represents the distance between the eye and the viewed object. For example in the case of an on-vehicle display device, the distance between the viewed object and the eye is approximately 60 cm. When the viewed object is located at 60 cm from the eye, the perceivable minimum pitch P is approximately 350 μm, according to the foregoing formula. If the cycle of brightness and darkness is 350 μm or more, a stripe- or grid-like pattern could be perceived by the human eye.

Assume that a pixel 142 of the monochrome liquid crystal panel 132 has a square shape and the pixel pitch is not less than 350 μm as illustrated in FIG. 7. In other words, assume that the pitch of the dark lines 307 and the pitch of the dark lines 309 of the black matrix 274 are not less than 350 μm.

Laying out a gate line 303 and a data line 254 so that they cross each other at the center of a pixel 142 corresponds to laying out the dark lines of the gate line 303 and the data line 254 at the middle between the dark lines of pixel boundaries (black matrix). This configuration doubles the spatial frequencies of brightness and darkness in the vertical direction and the horizontal direction to make the dark lines less perceivable for the observer. Designing the dark line pitch (interval) in one direction to be less than 350 μm effectively makes the dark lines less perceivable.

Figure 8:
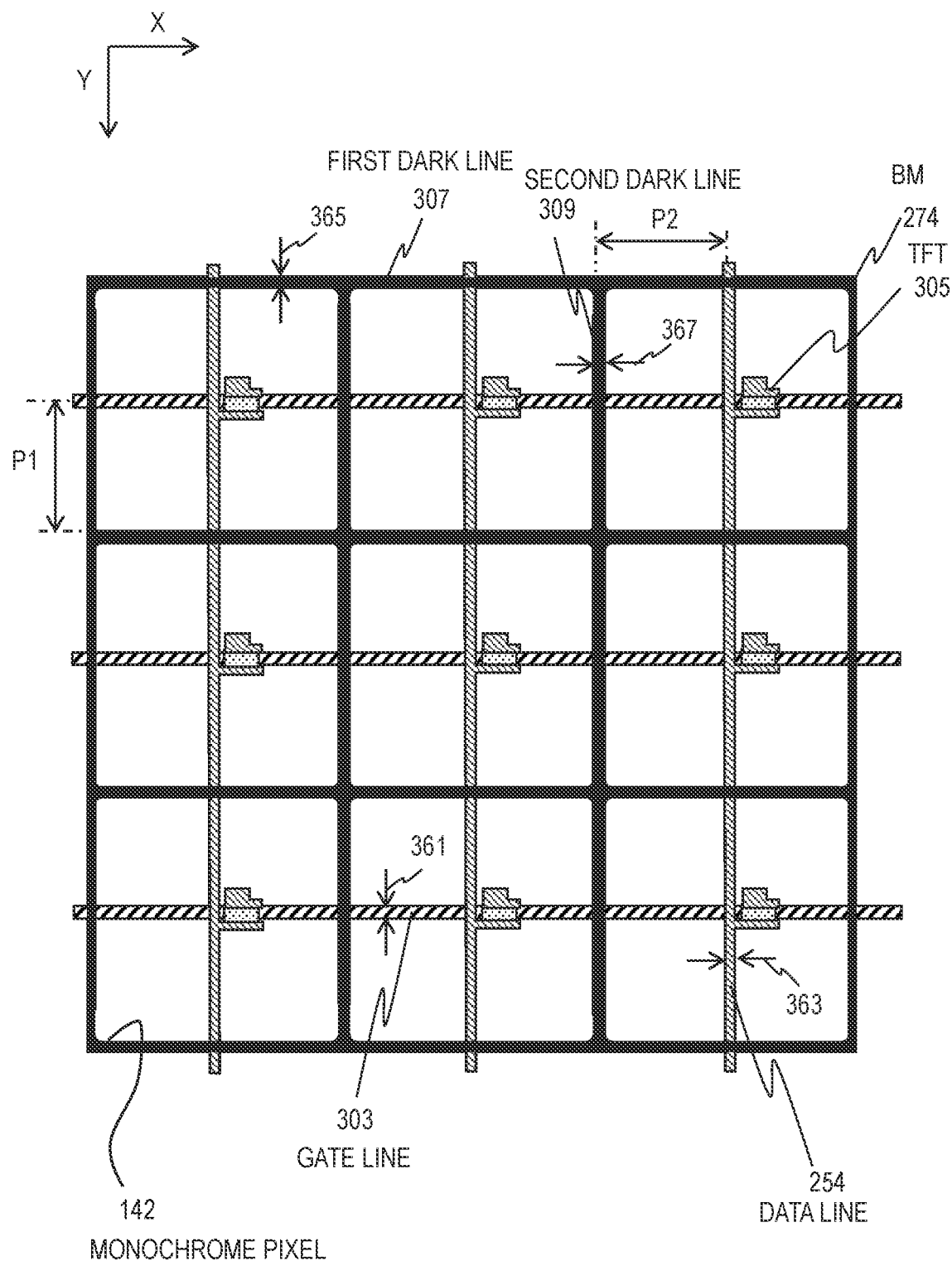
FIG. 8 is a plane diagram of another configuration example of the monochrome liquid crystal panel.

FIG. 8 is a plane diagram of another configuration example of the monochrome liquid crystal panel 132. FIG. 8 illustrates a layout of a black matrix, data lines, gate lines, and TFTs. Differences from the configuration example in FIG. 4 are described. In the configuration example in FIG. 8, at least the width 361 of the gate lines 303, the width 365 of the first dark lines 307 of the black matrix 274, the width 363 of the data lines 254, and the width 367 of the second dark lines 309 of the black matrix 274 are approximately equal. Using gate lines, data lines, and pixel boundaries having the same width enables the darkness generated by a dark line set to be evenly less perceivable.

Other Embodiments

Hereinafter, other layout examples of dark lines are described. In the examples to be described in the following, a gate line includes a plurality of parallel sub-gate lines and a data line includes a plurality of parallel sub-data lines. TFTs are provided at intersections between a sub-gate line and a sub-data line. One monochrome pixel is supplied with a data signal through a plurality of TFTs.

For this reason, the TFTs can be downsized to make the dark parts generated by the TFTs less perceivable. The number of sub-gate lines included in one gate line and the number of sub-data lines included in one data line are determined as desirable. Either the gate line or the data line can be composed of one main line without including a plurality of sub-lines.

Figure 9:
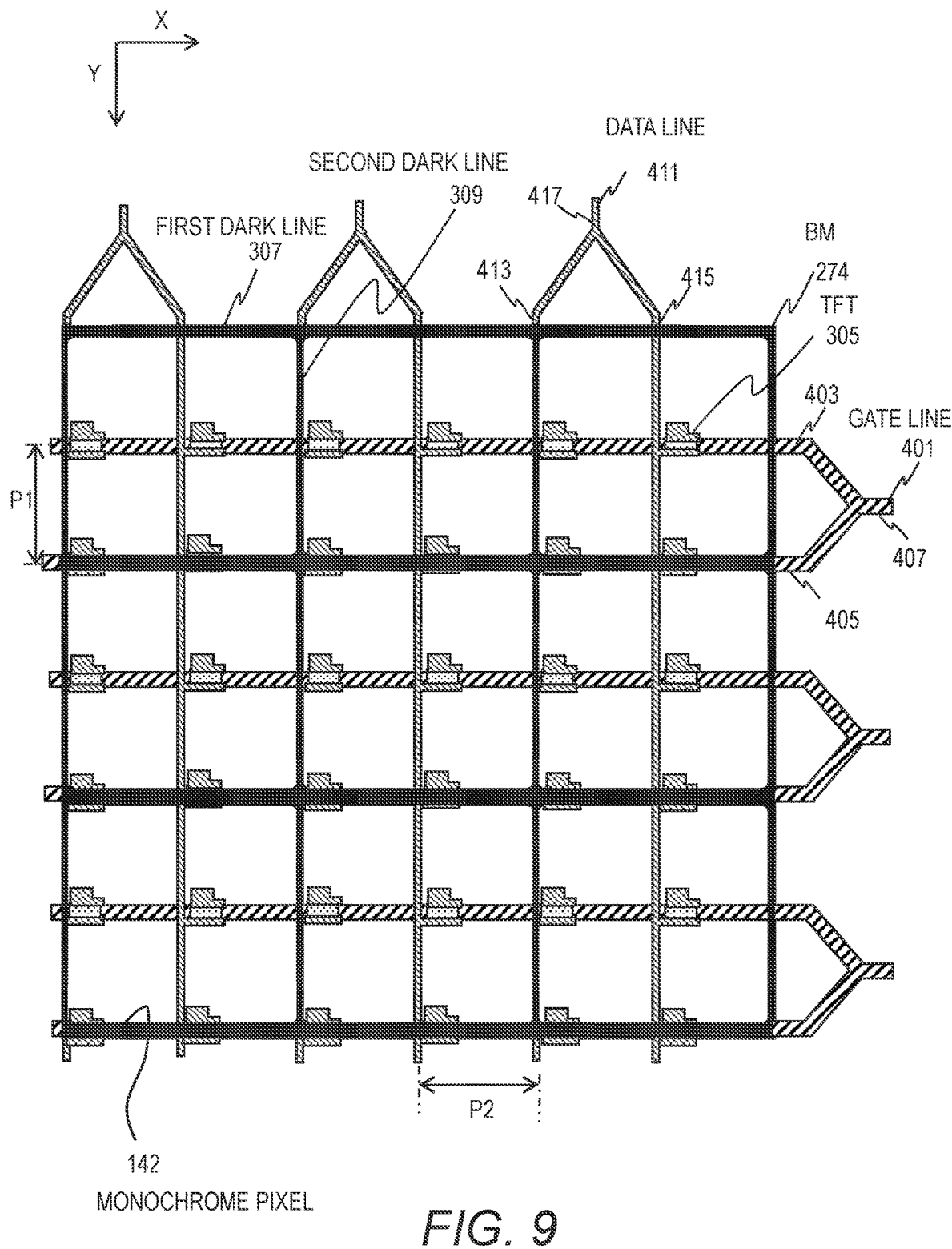
FIG. 9 illustrates a configuration example where each of the gate lines and the data lines includes a plurality of sub-lines.

FIG. 9 illustrates a configuration example where each of the gate lines and the data lines includes a plurality of sub-lines. A gate line in the configuration example in FIG. 9 includes two parallel sub-gate lines. One of the sub-gate lines is covered with the black matrix and the other one passes through monochrome pixels, when viewed planarly. One data line includes two parallel sub-data lines. One of the sub-data lines is covered with the black matrix and the other one passes through monochrome pixels, when viewed planarly. A TFT is provided at an intersection between a sub-gate line and a sub-data line. One monochrome pixel is supplied with a data signal through four TFTs.

As illustrated in FIG. 9, a gate line 401 includes two sub-gate lines 403 and 405 disposed to extend in the horizontal direction (the X-axis direction) and be distant from each other in the vertical direction (the Y-axis direction). The sub-gate lines 403 and 405 are parallel and branch off one transmission line 407. The sub-gate lines 403 and 405 branch off the transmission line 407 outside the display region and transmit the same gate signal. The sub-gate line 405 is covered with a first dark line 307 of the black matrix 274, when viewed planarly.

The other sub-gate line 403 extends in the horizontal direction between first dark lines 307 adjacent to each other and passes through monochrome pixels 142. First dark lines 307 and sub-gate lines 403 constitute a dark line set disposed at equal intervals (a specified pitch) P1.

A data line 411 includes two sub-data lines 413 and 415 disposed to extend in the vertical direction and be distant from each other in the horizontal direction. The sub-data lines 413 and 415 are parallel and branch off one transmission line 417. The sub-data lines 413 and 415 are connected with the transmission line 417 outside the display region and transmit the same data signal. The sub-data line 413 is covered with a second dark line 309 of the black matrix 274, when viewed planarly.

The other sub-data line 415 extends in the vertical direction between second dark lines 309 adjacent to each other and passes through monochrome pixels 142. Second dark lines 309 and sub-data lines 415 constitute a dark line set disposed at equal intervals (a specified pitch) P2.

In the configuration example in FIG. 9, four TFTs 305 are disposed in one monochrome pixel 142. For example, the four TFTs 305 are connected with one pixel electrode to supply the one pixel electrode with the same data signal.

Figure 10:
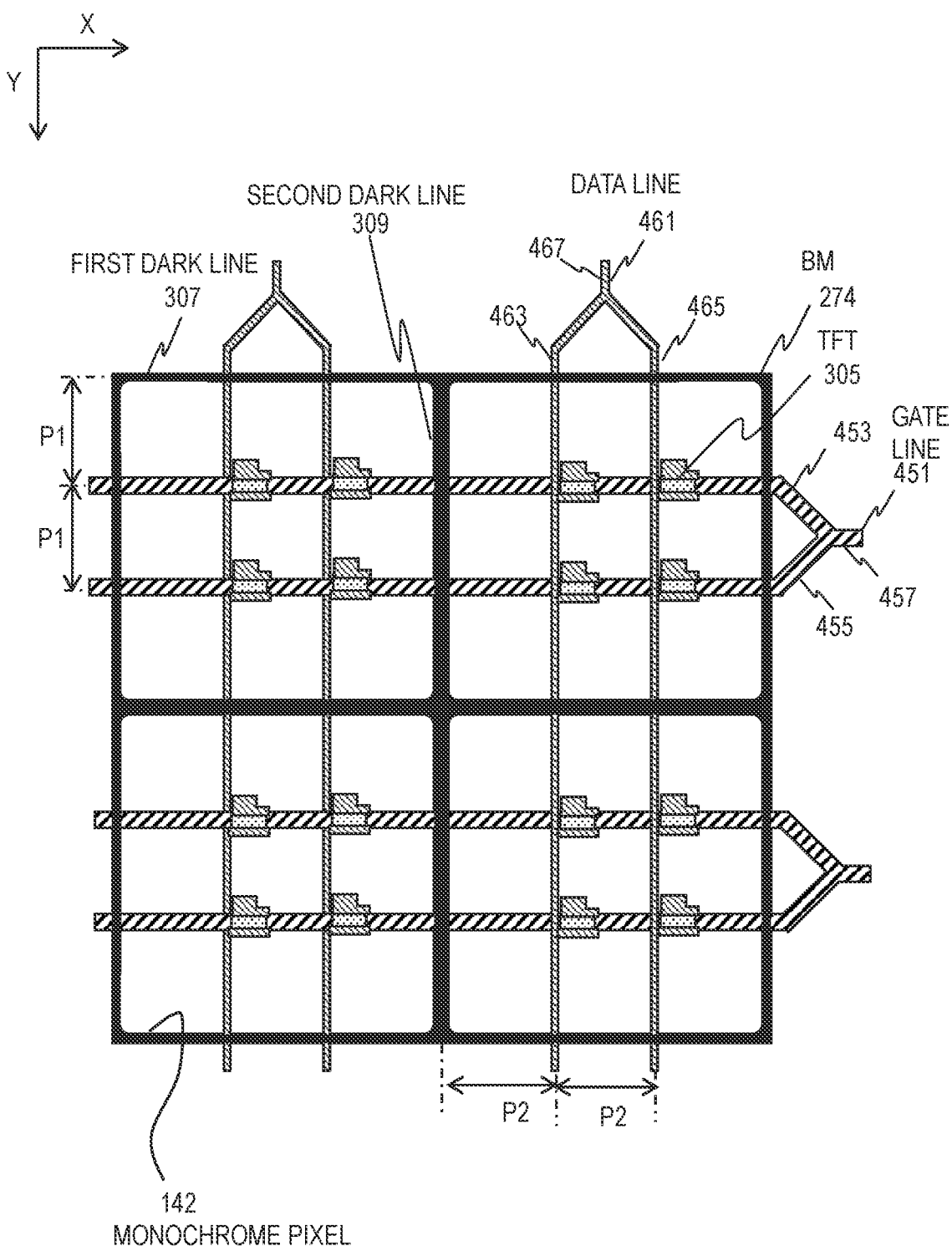
FIG. 10 illustrates another configuration example where each of the gate lines and the data lines includes a plurality of sub-lines.

FIG. 10 illustrates another configuration example where each of the gate lines and the data lines includes a plurality of sub-lines. A gate line in the configuration example in FIG. 10 includes two parallel sub-gate lines and both of the sub-gate lines pass through monochrome pixels. One data line includes two parallel sub-data lines and both of the sub-data lines pass through monochrome pixels.

As illustrated in FIG. 10, a gate line 451 includes two sub-gate lines 453 and 455 disposed to extend in the horizontal direction (the X-axis direction) and be distant from each other in the vertical direction (the Y-axis direction). The sub-gate lines 453 and 455 are parallel and branch off one transmission line 457. The sub-gate lines 453 and 455 branch off the transmission line 457 outside the display region and transmit the same gate signal.

The sub-gate lines 453 and 455 extend in the horizontal direction between first dark lines 307 adjacent to each other and pass through monochrome pixels 142. First dark lines 307 and sub-gate lines 453 and 455 constitute a dark line set disposed at equal intervals (a specified pitch) P1.

A data line 461 includes two sub-data lines 463 and 465 disposed to extend in the vertical direction and be distant from each other in the horizontal direction. The sub-data lines 463 and 465 are parallel and branch off one transmission line 467. The sub-data lines 463 and 465 are connected with the transmission line 467 outside the display region and transmit the same data signal.

The sub-data lines 463 and 465 extend in the vertical direction between second dark lines 309 adjacent to each other and pass through monochrome pixels 142. Second dark lines 309 and sub-data lines 463 and 465 constitute a dark line set disposed at equal intervals (a specified pitch) P2.

In the configuration example in FIG. 10, four TFTs 305 are disposed in one monochrome pixel 142. For example, the four TFTs 305 are connected with one pixel electrode to supply the one pixel electrode with the same data signal.

Figure 11:
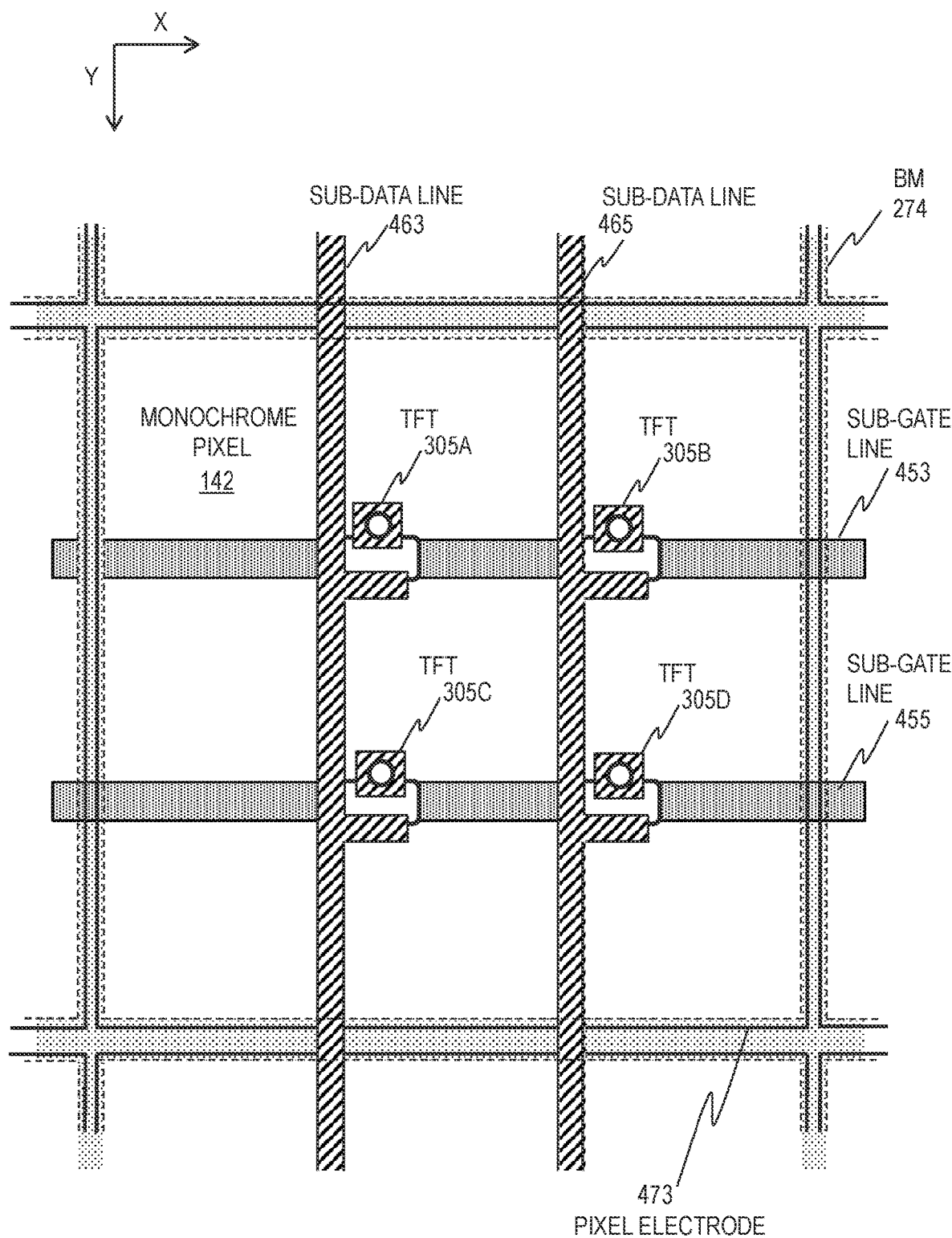
FIG. 11 is an enlarged diagram of a monochrome pixel in FIG. 10.

FIG. 11 is an enlarged diagram of a monochrome pixel 142 in FIG. 10. At the intersection between the sub-gate line 453 and the sub-data line 463, a TFT 305A connected with the sub-lines is provided. At the intersection between the sub-gate line 453 and the sub-data line 465, a TFT 305B connected with the sub-lines is provided. At the intersection between the sub-gate line 455 and the sub-data line 463, a TFT 305C connected with the sub-lines is provided. At the intersection between the sub-gate line 455 and the sub-data line 465, a TFT 305D connected with the sub-lines is provided.

Each of the TFTs 305A to 305D is connected with a pixel electrode 473 in a contact hole. The sub-gate lines 453 and 455 transmit the same gate signal and the TFTs 305A to 305D are selected (turned on) simultaneously. The sub-data lines 463 and 465 transmit the same data signal and the TFTs 305A to 305D supply the same data signal to the pixel electrode 473. The pixel electrode can have any shape suitable for the type of the monochrome liquid crystal panel 132, as far as it can control the amount of light to be transmitted through the pixel.

Figure 12:
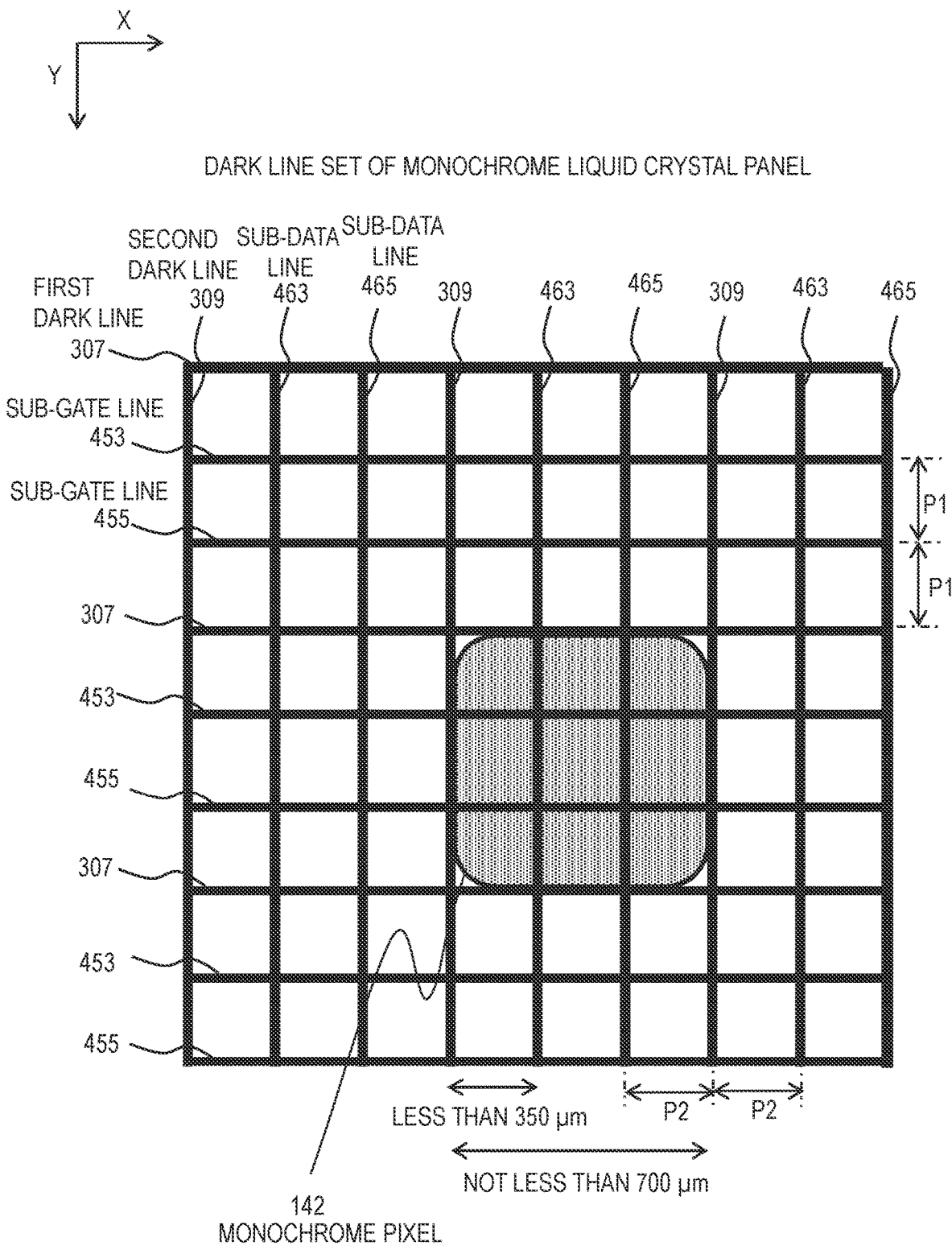
FIG. 12 schematically illustrates a dark line set in the configuration example in FIG. 10.

FIG. 12 schematically illustrates the dark line set in the configuration example in FIG. 10. The dark line set is composed of the dark lines 307 and 309 of the black matrix, the sub-gate lines 453 and 455, and the sub-data lines 463 and 465 disposed like a grid. In the example in FIG. 12, the first dark lines 307 and the sub-gate lines 453 and 455 constitute a dark line set disposed at equal intervals (a specified pitch) P1 in the vertical direction (the Y-axis direction). This dark line set has high spatial frequency in the vertical direction and therefore, the dark line set composed of the first dark lines 307 and the sub-gate lines 453 and 455 is less perceivable.

The second dark lines 309 and the sub-data lines 463 and 465 constitute a dark line set disposed at equal intervals (a specified pitch) P2 in the horizontal direction (the X-axis direction). This dark line set has high spatial frequency in the horizontal direction and therefore, the dark line set composed of the second dark lines 309 and the sub-data lines 463 and 465 is less perceivable.

Assume that a pixel 142 of the monochrome liquid crystal panel 132 has a square shape and the pixel pitch is not less than 700 μm as illustrated in FIG. 12. In other words, assume that the pitch of the dark lines 307 and the pitch of the dark lines 309 of the black matrix 274 are not less than 700 μm.

As to each monochrome pixel 142, two sub-gate lines 453 and 455 pass through the monochrome pixel 142 in the horizontal direction and two sub-data lines 463 and 465 pass through the monochrome pixel 142 in the vertical direction. As described above, the intervals between dark lines in the vertical direction and the intervals between dark lines in the horizontal direction are uniform. Accordingly, the intervals between dark lines in the vertical direction and the horizontal direction can be made less than 350 μm. As understood from the above, data lines and/or gate lines including a plurality of parallel sub-lines enable the dark line set to have a spatial frequency less perceivable for the observer, even if the pixel pitch of the monochrome pixels is large.

Figure 13:
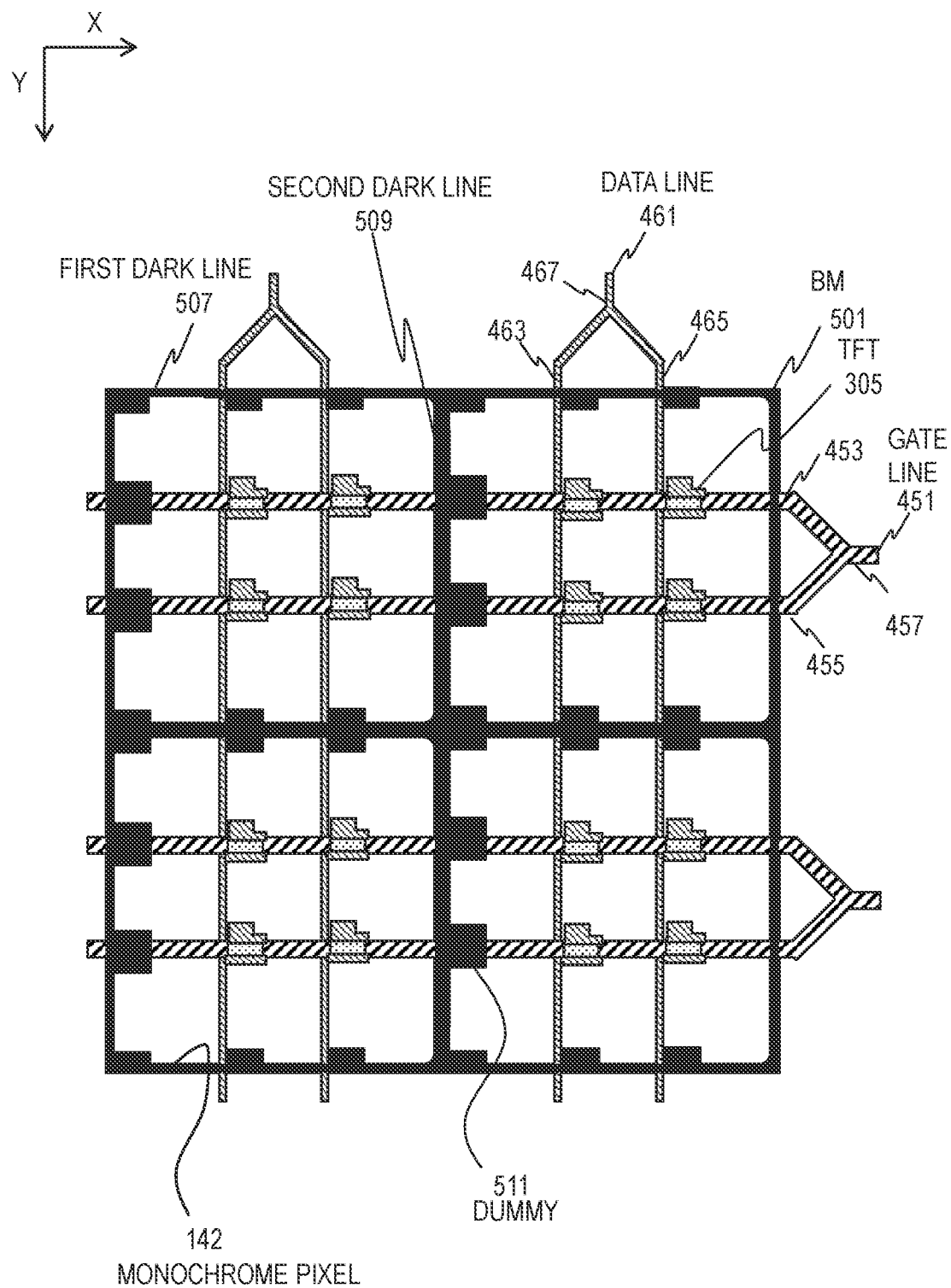
FIG. 13 illustrates still another configuration example where each of the gate lines and the data lines includes a plurality of sub-lines.

FIG. 13 illustrates still another configuration example where each of the gate lines and the data lines includes a plurality of sub-lines. Differences from the configuration example in FIG. 10 are described. In the configuration example in FIG. 13, a black matrix 501 includes a dummy pattern of TFTs 305. The dummy pattern is composed of a plurality of dummies 511 of TFTs 305 to be included in the black matrix 501. A dummy 511 is a rectangular dark part approximated to a TFT 305 when viewed planarly. The dummy 511 can have the identical shape to the shape of the TFT 305 when viewed planarly.

The dark part pattern including the dummy pattern and the TFTs 305 are composed of the dark parts disposed evenly in the display region. In other words, the TFTs 305 and the dummies 511 form dark part lines each composed of dark parts disposed at equal intervals in the horizontal direction and dark part lines each composed of dark parts disposed at equal intervals in the vertical direction. Providing dummies 511 of the black matrix 501 at the intersections where no TFT 305 is provided complements the regularity of brightness and darkness in the display region.

In the embodiments in FIGS. 9 and 10, the first dark lines, the sub-gate lines, the second dark lines, and the sub-data lines have approximately the same width, like in the example in FIG. 8. In the embodiment in FIG. 13, the dark lines except for the dummy pattern on the first dark lines, the sub-gate lines, the dark lines except for the dummy pattern on the second dark lines, and the sub-data lines have approximately the same width.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A display device, comprising:
    a first liquid crystal panel configured to display an image to be seen by an observer; and
    a second liquid crystal panel laid on the first liquid crystal panel, the second liquid crystal panel including pixels that are a natural number times as large as pixels of the first liquid crystal panel,
    wherein the second liquid crystal panel includes:
        a black matrix, defining pixels;
        a plurality of opaque gate lines disposed to be distant from one another in a first direction; and
        a plurality of opaque data lines disposed to be distant from one another in a second direction different from the first direction,
    wherein the plurality of opaque gate lines and the plurality of opaque data lines pass through the pixels,
    wherein the opaque gate lines, and first lines of the black matrix disposed to be distant from one another in the first direction, constitute dark lines disposed at a first pitch (P1) in the first direction,
    wherein the opaque data lines, and second lines of the black matrix disposed to be distant from one another in the second direction, constitute dark lines disposed at a second pitch (P2) in the second direction,
    wherein widths of the opaque gate lines and widths of the first lines of the black matrix are equal, and
    wherein widths of the opaque data lines and widths of the second lines of the black matrix are equal.

2. The display device according to claim 1, wherein both the plurality of opaque gate lines and the plurality of opaque data lines pass through the pixels.

3. The display device according to claim 1,
    wherein each of the plurality of opaque gate lines consists of one line,
    wherein each of the plurality of opaque data lines consists of one line,
    wherein each gate line intersects with the plurality of data lines at a middle of an individual pixel of the pixels, and
    wherein transistors are provided at intersections of each gate line with the plurality of opaque data lines.

4. The display device according to claim 1,
    wherein each of the plurality of opaque gate lines is formed as a plurality of sub-gate lines branching off one transmission line, disposed to be distant from one another in the first direction,
    wherein each of the plurality of opaque data lines is formed as a plurality of sub-data lines branching off one transmission line, disposed to be distant from one another in the second direction, and
    wherein transistors are provided at intersections of each of the plurality of sub-gate lines with the plurality of sub-data lines.

5. The display device according to claim 4,
    wherein one sub-gate line of the plurality of sub-gate lines is covered with the black matrix and at least one other sub-gate line of the sub-gate lines passes through the pixels, and
    wherein one sub-data line of the plurality of sub-data lines is covered with the black matrix and at least one other sub-data line of the sub-data lines passes through the pixels.

6. The display device according to claim 4,
    wherein each one of the plurality of sub-gate lines passes through the pixels, and
    wherein each one of the plurality of sub-data lines passes through the pixels.

7. The display device according to claim 1,
    wherein transistors are provided at intersections between a gate line and a data line, and
    wherein the black matrix includes a dummy pattern of transistors.

8. The display device according to claim 1,
    wherein the first pitch (P1) of the gate lines and the first lines of the black matrix is less than 350 μm in the first direction, and
    wherein the second pitch (P2) of the data lines and the second lines of the black matrix is less than 350 μm in the second direction.

* * * * *